UNITED STATES PATENT OFFICE 2,582,842

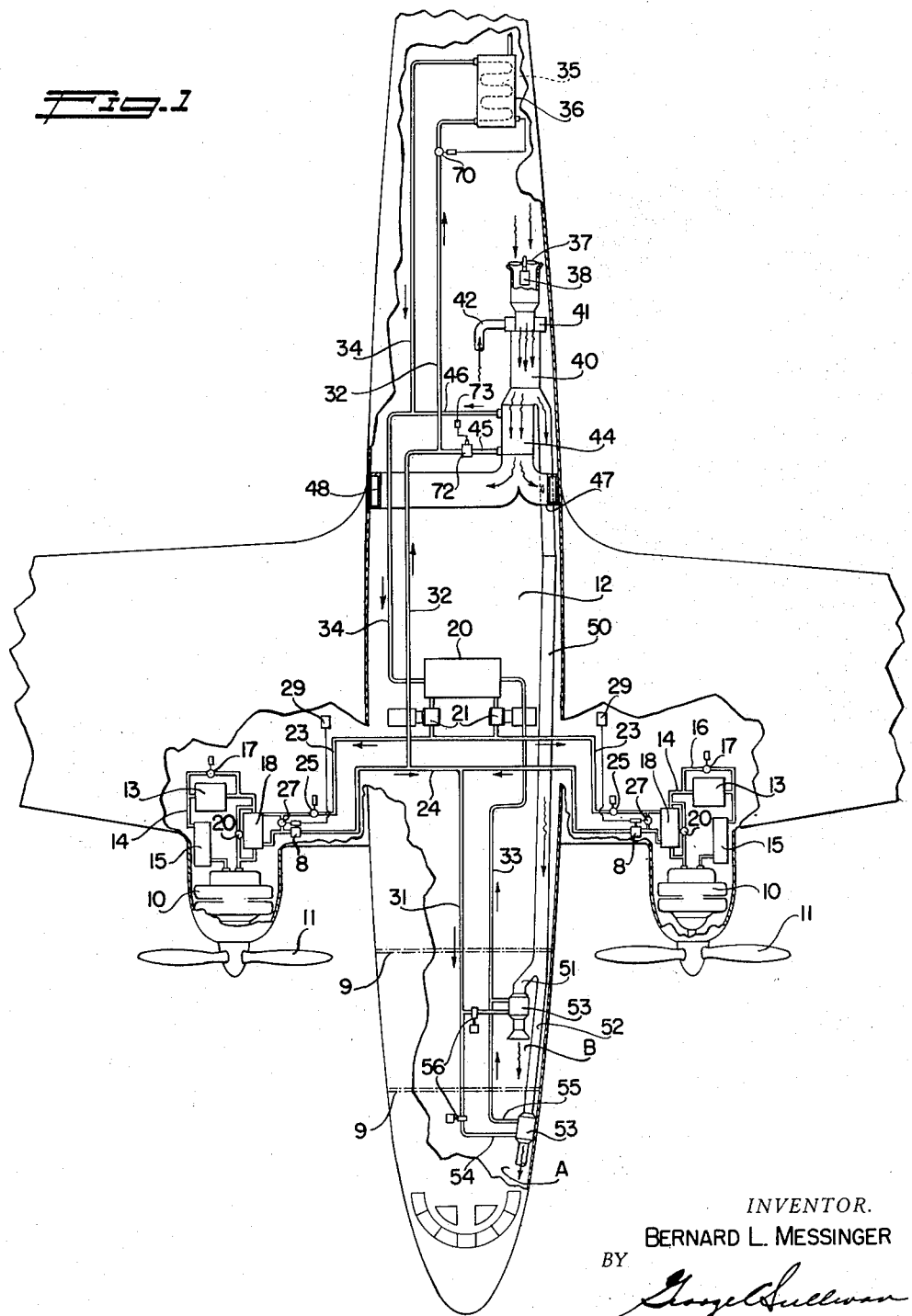

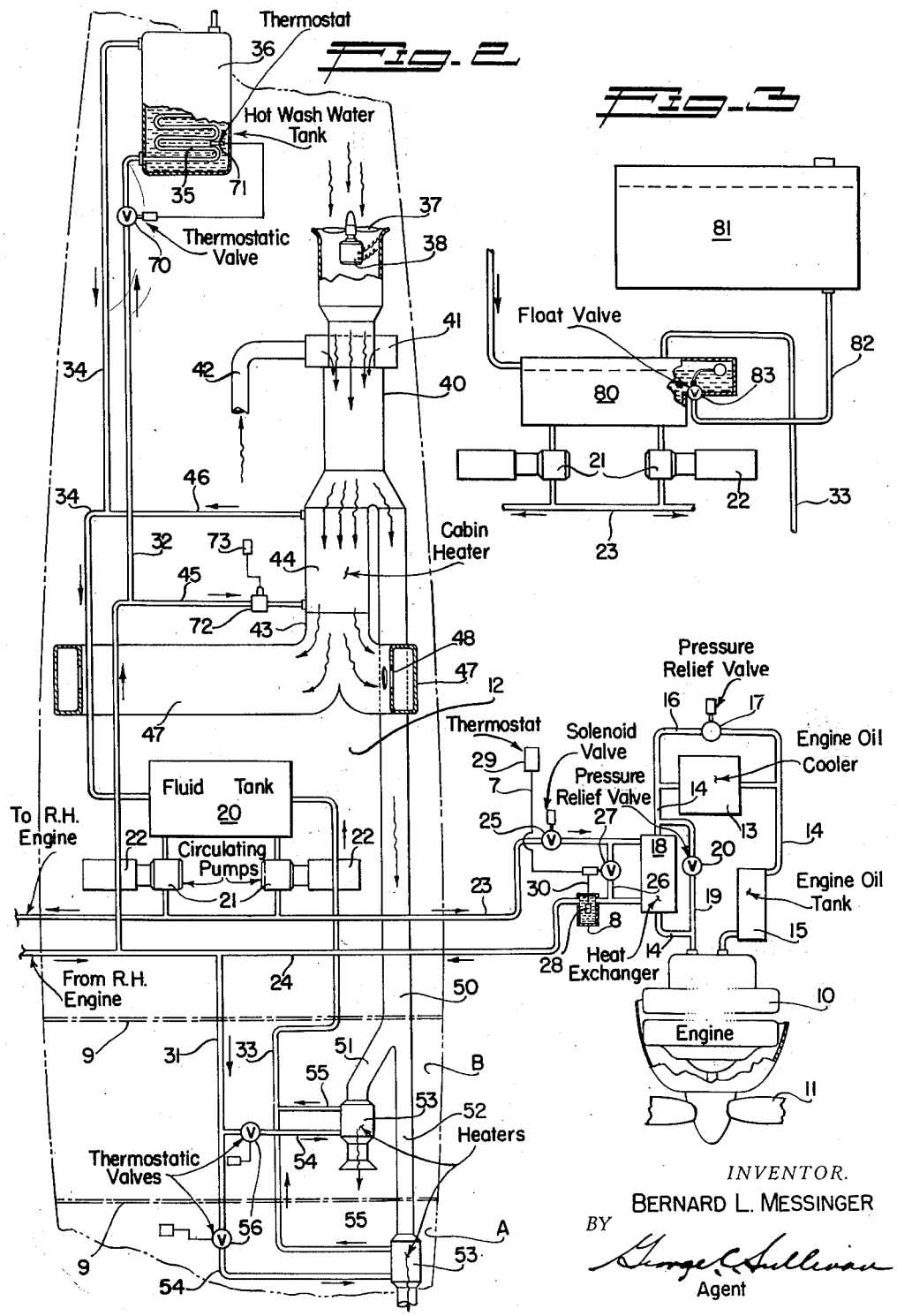

AIRCRAFT HEATING SYSTEM

Bernard L. Messinger, Pacific Palisades, Calif., assignor to Lockheed Aircraft Corporation, Burbank, Calif.

Application September 24, 1948, Serial No. 51,083

3 Claims. (Cl. 237—8)

This invention relates to heating systems, and relates more particularly to heating systems for aircraft and other vehicles having propulsion engines.

Airplanes, being subject to a wide range of temperatures, are usually equipped with cabin heaters for the comfort of the passengers and crew. At the present time, combustion heaters are used extensively for this purpose. Such combustion heaters require combustion air supplies, fuel lines, fuel pumps and burners, and are definite fire hazards. Cabin heaters have also been introduced which utilize the heat of the engine exhaust gases. This latter type of heating system usually includes one or more heat exchangers at the engine exhaust stacks for effecting an exchange of heat from the exhaust gases to a circulating liquid heating medium, such as glycol, the heated liquid being circulated through liquid-to-air heat exchangers in the cabin compartment, etc. The temperatures of the engine exhaust exchangers are so high that the glycol or other circulating medium soon breaks down and the high temperatures also cause rapid deterioration of the heat exchanger equipment. For these and other reasons the present day aircraft heating systems are not altogether satisfactory and reliable.

It is an object of the present invention to provide a heating system for aircraft that is simple, reliable and entirely safe. The system of the invention does not necessitate the combustion of heating fuel and does not utilize the excessively hot engine exhaust gases and is, therefore, long wearing, not subject to failure due to the breakdown of the heating medium and can not cause dangerous, costly fires.

Another object of the invention is to provide a heating system of the character mentioned that may employ two or more heat sources with practically no increase in the cost of operation of the airplane and which may be designed to effect an extremely flexible and compact distribution of the heat. The system utilizes heat which must be rejected from the propulsive engines in one manner or another, for the efficient operation of the engines and may employ such heat from one, two, three or more engines to assure adequate heating of the aircraft at all times or when required. The system transfers heat from a liquid heating medium to a large mass flow of air to obtain a flexible, mild and distributed space or cabin heating action with a desirable air circulation throughout the cabin or space to be heated. In addition, the liquid heating medium may be employed to heat water for the lavatories, etc. and to heat steam tables and the like, in the galley.

A further object of the invention is to provide a heating system of the character referred to which utilizes heat derived from the lubricating oil of the propulsive engines. Modern aircraft engines employ substantial volumes of lubricating oil, which oil is constantly circulated through the engines into oil coolers and thence back into the engines. In fact, this oil serves in a large measure to cool the engines in addition to lubricating their bearings, etc. and the oil is discharged from the engine at a rather high temperature, often 200° F. The heat is rejected from the oil in the oil coolers before the oil is returned to the engines. In accordance with the present invention a considerable proportion of the heat carried by the oil leaving the engines is transferred to a suitable liquid heating medium by means of heat exchangers, the liquid medium being circulated through cabin heaters, wash-water tanks, steam tables, etc. Thus the heat contained in the engine oil and which must be rejected before the oil is returned to the engines, is utilized in an efficient manner to heat the cabin, etc. at practically no expenditure of power, fuel, or engine efficiency.

A still further object of the invention is to provide a heating system of the character mentioned incorporating automatic controls to maintain a selected or correct cabin temperature, to by-pass the engine lubricating oil around or past the heat exchangers during engine warm-up, etc. and other appropriate automatic controls.

Other objectives and features of the invention will become apparent from the following detailed description of a typical preferred form of the invention throughout which description reference is made to the accompanying drawings wherein:

Figure 1 is a fragmentary plan view of a typical airplane with portions thereof broken away to illustrate the heating system of the invention in a diagrammatic manner; and Figure 2 is an enlarged diagrammatic view of the major portion of the heating system of the invention; and Figure 3 is a fragmentary, diagrammatic view of an optional form of liquid heating medium supply means for the system.

The system or apparatus of the invention is capable of considerable variation and is suitable for use in aircraft, etc. of various types, sizes, etc. propelled by one, two, or more engines of practically any type.

In the drawings I have illustrated the invention applied to a multi-engine airplane, employing reciprocating engines 10 for driving propellers 11. Two engines are illustrated, it being apparent that the airplane may include additional propulsive engines. The airplane has a fuselage or cabin 12 for housing the crew, passengers, freight, etc. and this cabin may be divided or partitioned into the pilot's compartment, wash-rooms, galley, etc. In the case illustrated, two spaced partitions 9 in the forward portion of the cabin 12 provide or define two compartments A and B in addition to the main cabin area or compartment. Each engine 10 has a lubricating system, not shown, which continuously circulates lubricating oil under pressure during engine operation to the various bearings, crank cases, etc. The oil thus circulated through the engine becomes heated and it is necessary or desirable to reject the heat from the oil to insure proper engine lubrication and cooling. For this purpose each engine is equipped with an oil cooler 13 and a line or pipe system 14 for conducting the hot oil from the engine to the cooler and thence back into the engine. A reservoir or tank 15 is connected in the portion of this system 14 which carries the cooled oil back to the engine 10. A by-pass 16 extends around the oil cooler 13 and is controlled by a low temperature pressure relief valve 17 so that the engine lubricating oil, or a portion thereof, is circulated around the cooler during starting and warming up of the engine. The equipment thus far described is conventional and typical in modern day aircraft.

The system of the invention includes a heat exchanger 18 connected in the oil circulating system 14 of each engine 10. It is preferred to connect the heat exchangers 18 in the portions of the systems 14 which conduct the hot oil from the engines to the coolers 13 and to arrange the heat exchangers so that they are in series relation to the coolers. A by-pass duct or line 19 extends around each heat exchanger 18 and is controlled by a pressure relief valve 20 so as to by-pass the oil or a portion thereof around the heat exchanger during cold engine starts, engine warm-up operations, etc. The heat exchangers 18 are of the type designed to effect a transfer of heat from the hot engine lubricating oil to a liquid heating medium such as a glycol fluid. It is preferred to employ efficient heat exchangers 18 of this class although any appropriate device of this kind may be employed. In practice the heat exchangers 18 need not be excessively large or heavy.

In accordance with the invention the liquid heating medium is circulated through the heat exchangers 18 to absorb heat from the hot engine lubricating oil and is then passed through cabin heaters, wash-water tanks, galley steam tables, etc. to give up its heat therein. It will be appreciated that the liquid heating medium circulating system may be varied considerably in detail to adapt the invention for use in different airplanes, etc. In the particular case illustrated, the liquid heating medium system includes a tank 201 for containing a supply of the liquid. Two circulating pumps 21, driven by motors 22, draw the liquid from the tank 201 and discharge it under pressure into a manifold pipe 23. Only one pump 21 is required in the operation of the system and the second pump 21 is a stand-by or auxiliary for use in the event of failure or break-down of the first pump. The pumps 21 are preferably of the centrifugal type or are provided with internal pressure relief means. The manifold pipe 23 extends to the intake sides of the heat exchangers 18, serving to deliver the liquid to the heat exchangers for passage therethrough. It will be apparent that where heat is to be extracted from the lubricating oil of additional engines, the manifold pipe 23 extends to the heat exchangers 18 associated with the oil circulating systems of such additional engines.

The system for circulating the liquid heating medium further includes a manifold pipe 24, receiving the heated liquid after its passage through the heat exchangers 18. The pipe 24 is in the nature of a common manifold extending from the outlets of the two heat exchangers 18 and any other additional heat exchangers that may be employed. Valves 25 may be incorporated in the manifold pipes 23 at points upstream from the heat exchangers 18 and upstream from any other heat exchangers 18 that may be included in the system. The valves 25 may preferably be of the solenoid operated type to be remotely controlled through suitable electrical connections (not shown). In the event an engine 10 is shut down the valve 25 associated with the heat exchanger 18 at that engine is closed to prevent glycol flow through the heat exchanger 18 at that engine and thus prevent a heat loss in the idle heat exchanger. By-pass lines 26 connect the manifold pipes 23 and 24 adjacent each heat exchanger 18 and are controlled by valves 27. The valves 27 may be electrically operated and are under the thermostatic control of thermal elements 28 and thermal elements 29. The thermal elements 28 are sensitive to or responsive to the temperature of the glycol liquid in the manifold lines 24. Thus in the case illustrated, the elements 28 are located in wells 8 in the lines 24 and operative connections 30 extend from the elements to the operating means of the respective valves 27. The thermal elements 29 sense or respond to outside or ambient atmospheric temperature to modify the action of the elements 28 and operative connections 7 extend from the elements 29 to the valves 27. The thermostatic controls for the valves 27 serve to control the temperature of the heated liquid medium circulated to the various heaters, etc. by varying the amount of the liquid medium that is allowed to by-pass the heat exchangers and the thermostatic controls operate to maintain a desirable relationship between the temperature of the circulating liquid medium and the ambient atmospheric temperature. For example, when the ambient air temperature is —60° F. the valves 27 are operated by the thermostats 28 and 29 to cause the liquid medium to be circulated at about +160° F. and when the ambient air temperature is +40° F. the liquid medium is circulated at about +110° F., the operation being substantially linear between such limits.

One or more distribution lines extend from the manifold pipe 24 to the various heaters, water-tanks, steam tables, etc. to supply the heated liquid medium thereto. In the particular case illustrated, there are two main distribution pipes or lines, one line 31 extending forwardly to the forward areas or compartments of the cabin 12, and one line 32 extending from the pipe 24 aft to the rear parts of the cabin. The liquid heating medium circulating system also includes return lines for returning the heating medium to the reservoir tank 201 after its passage through the heaters, hot water tanks, etc. In the drawings there are two main return pipes, one pipe 33 leading from the forward areas of the cabin 12 to the tank 20I, and the second pipe 34 extending from the aft portions of the cabin to the tank. The aft supply line 32 may extend to one end of a coil 35, positioned within a hot water tank 36, and the return pipe 34 may extend from the other end of the coil to the reservoir tank 20I. A thermostatically controlled valve 70 is connected in the pipe 32 adjacent the water tank 36 and is controlled by a thermostat 7I responsive to the temperature of the water in the tank. The hot circulating fluid flowing through the coil 35 heats the water in the tank 36.

The invention includes a simple and efficient series arrangement of heaters characterized by a single blower or fan 37 for circulating air to the various cabin compartment heaters, etc. The fan 37 may be driven by an electric motor 38 and is arranged at the inlet end of a main air duct 40 to induce or draw a substantial mass flow of air into the duct for flow therethrough. The air receiving end of the duct 40 is open to the interior of the main cabin 12 or to some other interior part of the airplane. In the illustrative example illustrated, the inlet end of the duct 40 is open to the aft portion of the cabin 12 so that the fan 37 recirculates cabin air through the duct. At a point downstream from the fan 37 there is provided a scroll or muff 4I communicating with the duct 40 and supplied with outside or atmospheric air for ventilating purposes. I have shown a pipe or duct 42 for supplying air to the muff 4I from a cabin supercharger, air scoop, or other source of external air not shown. The air admitted by the duct 4I is blended or mixed with the air received at the inlet end of the duct 40.

A branch or arm 43 of the duct 40, which may be considered a main continuation of the duct, is provided with a cabin heater 44. The heater 44 is in the nature of a heat exchanger or a radiator for effecting an efficient transfer of heat from the circulating liquid heating medium to the air flowing through the duct 43. A branch pipe 45 conducts the liquid heating medium from the supply pipe 32 to the liquid inlet of the heater 44 and a pipe 46 returns the liquid from the liquid outlet of the heater to the return line 34. A flow control valve 72 is connected in the pipe 45 and is under the control of a thermostat 73 which senses the temperature in the main cabin 12. The air heated in the heater 44 by the circulating liquid heating medium may be supplied to or discharged into the cabin 12 in any selected or appropriate manner. In the case illustrated the duct 43 has two branches 47 which serve to distribute the heated air to appropriately positioned outlets 48, discharging into the cabin area.

The heating system further includes a branch duct 50 leading forwardly from the duct 40. The branch 50 may join the duct 40 at a point upstream from the duct 43 and heater 44. The branch duct 50 may, in turn, supply air to one, two or more ducts, leading to given areas or compartments of the airplane. In the case illustrated there are two branches or distribution ducts 5I and 52 receiving air from the duct 50 and delivering it to the forward areas or compartments A and B of the airplane. A heater 53 in the form of a heat exchanger or radiator for transferring heat from the liquid heating medium to the air is provided for each duct 5I and 52. The forward supply line 3I, carrying the liquid heating medium, has branches 54 leading to the liquid inlet of the heaters 53 to deliver liquid heating medium to the heaters. In like manner the return line 33 has branches 55 receiving the liquid heating medium from the outlets of the heaters 53 for return to the reservoir tank 20I. The branch supply pipes 54 have thermostatic valves 56 responsive to the air temperatures within the respective compartments A and B to control the flow of the liquid heating medium to the heaters 53.

It is believed that the operation of the heating system of the invention will be readily understood from the foregoing detailed description. During cold engine starts and engine warm-up operations the valves 26 in the by-pass lines I9 will be open to by-pass oil around the heat exchangers I8. However, during normal operations of the airplane, the engine oil at a temperature of 200° F. or higher is circulated through the heat exchangers I8. The pump 2I circulates the liquid heating medium through the heat exchangers I8 where it is heated by the hot engine lubricating oil. The volume or amount of the liquid medium circulated through the heat exchangers I8 is regulated by the valves 27 which, in turn, are controlled by the thermostats 28 and 29, respectively, sensing the temperature of the circulating liquid medium and the ambient air. The liquid heating medium is circulated through the lines described above to the several heaters 44 and 53 and the fan 37 continuously circulates air through the air ducts. This air is heated at the heaters 44 and 53 prior to being discharged into the cabin 12 and compartments A and B. The system is such that large or relatively large volumes of air are continuously heated and distributed to the cabin 12 and/or compartments to bring about a mild and highly desirable heating action. Furthermore, outside air is continuously mixed with the recirculated cabin or interior air to properly ventilate the cabin 12 and compartments A and B. In addition to heating the spaces or cabin areas, the liquid heating medium from the heat exchangers I8 may be employed to heat water in the tank 36, other water tanks, and galley steam tables, etc. It will be observed that the system of the present invention does not require the burning of heating fuel with the dangers attending the same, and does not require the installation of heat exchangers at the exhaust stacks or ducts of the engine, where the temperatures are excessively high. The system necessitates a minimum of alteration or change in the lubricating oil circulated and cooling system of the propulsive engines and does not adversely affect engine operation in any way. The system employs a liquid heating medium and, therefore, may utilize small light-weight pipes, ducts, etc.

Figure 3 illustrates a portion of the liquid heating medium system designed for use in installations or aircraft where it may be desired to heat the cabin in a minimum of time upon "cold starts" of the engines. In this construction a relatively small reservoir tank 80 is connected between the two return lines 33 and 34 and the intake or low pressure sides of the pumps 2I. The liquid heating medium currently employed in the system is supplied by the small capacity tank. The mass of the liquid heating medium continuously circulated in the system is minimized by the use of the small capacity tank and during "cold starts" the currently flowing liquid quickly warms up. In order to insure adequate replenishing of the liquid heating medium I provide a make up tank 81 of suitable capacity connected with the tank 80 by a pipe 82. The tanks 80 and 81 may be related so that the liquid flows by gravity from the tank 81 to the tank 80. A float controlled valve 83, sensitive to the level of the liquid in the tank 80, controls the delivery or flow of the liquid from the tank 81 to the tank 80 to at all times maintain sufficient liquid in the system.

Having described only a typical form of the invention, I do not wish to be limited to the specific details herein set forth, but wish to reserve to myself any variations or modifications that may appear to those skilled in the art and fall within the scope of the following claims.

I claim:

1. In an aircraft having a cabin space and a plurality of propulsive engines each provided with a lubricating system circulating hot oil including a duct for carrying hot oil from the engine and for returning the oil to the engine; the combination of a liquid medium circulating system external of the engines and including duct means for said medium, and pump means for circulating said medium through the duct means, a heat exchanger adjacent each engine and connected in the duct means of said circulating system for effecting a transfer of heat from the hot oil in said lubricating systems to the circulating liquid medium, heater means connected in the duct means of said circulating system and located to heat said cabin space with the heat extracted from said liquid medium, and valve means in said circulating system operable to selectively isolate the individual heat exchangers from the circulating system when their respective engines are idle.

2. In an aircraft having a cabin space and a propulsive engine provided with a lubricating system circulating hot oil including a duct for carrying hot oil from the engine and for returning the oil to the engine; the combination of a liquid medium circulating system external of the engine including duct means for said medium and a pump for circulating said medium through the duct means, a relatively small liquid supply tank connected in the second named system, a larger supply tank connected with the small tank to replenish the liquid in the second named system, means responsive to the liquid level in the small tank for controlling the delivery of liquid from the larger tank to the small tank, heat exchanger means connected in said systems for bringing the hot oil in heat transfer relation to the liquid circulating in said second named system to heat said medium, and means for bringing said heated circulating medium into heat transfer relation to the air in said cabin space to heat the same.

3. A heating system for an aircraft having a cabin space to be heated and a power plant which is lubricated by a lubricating oil which becomes heated as a result of the operation of the power plant, said system including first and second heat exchangers, duct means for connecting said heat exchangers in series so that hot lubricating oil may be circulated from said power plant through said heat exchangers and back to said power plant, a third heat exchanger of the liquid-air type through which air is circulated to said cabin, duct means for a liquid heat transferring medium connecting said second and third heat exchangers, said liquid medium absorbing heat from said hot lubricating oil to cool the latter and releasing said heat to said air as it passes through said third heat exchanger to heat said cabin space, a by-pass around said second heat exchanger, and means responsive to the temperature of the heat transferring medium for regulating the flow of said liquid medium through said by-pass.

BERNARD L. MESSINGER.

REFERENCES CITED

The following references are of record in the file of this patent:

UNITED STATES PATENTS

| Number | Name | Date |
|---|---|---|
| 2,027,315 | Higgins | Jan. 7, 1936 |
| 2,034,235 | Holmes | Mar. 17, 1936 |
| 2,065,481 | Thulman | Dec. 22, 1936 |
| 2,131,017 | Lintern et al. | Sept. 20, 1938 |
| 2,268,478 | Fehrer | Dec. 30, 1941 |
| 2,304,642 | Hans | Dec. 8, 1942 |
| 2,404,597 | McClain | July 23, 1946 |

FOREIGN PATENTS

| Number | Country | Date |
|---|---|---|
| 118,249 | Australia | Mar. 23, 1944 |